United States Patent
Koeda et al.

(10) Patent No.: US 6,820,737 B2
(45) Date of Patent: Nov. 23, 2004

(54) TRAVELING FRAME DEVICE IN CONVEYOR SYSTEM

(75) Inventors: Motoya Koeda, Saitama (JP); Kazuyuki Kobayashi, Saitama (JP)

(73) Assignee: Yamakyu Chain Co., Ltd., Tokyo (JP)

( * ) Notice: Subject to any disclaimer, the term of this patent is extended or adjusted under 35 U.S.C. 154(b) by 33 days.

(21) Appl. No.: 10/363,853

(22) PCT Filed: Dec. 27, 2001

(86) PCT No.: PCT/JP01/11537

§ 371 (c)(1),
(2), (4) Date: Mar. 14, 2003

(87) PCT Pub. No.: WO02/068298

PCT Pub. Date: Sep. 6, 2002

(65) Prior Publication Data

US 2004/0011628 A1 Jan. 22, 2004

(30) Foreign Application Priority Data

Feb. 27, 2001 (JP) ........................................ 2001-052176

(51) Int. Cl.[7] ........................... B65G 15/60; B65G 17/00
(52) U.S. Cl. ..................................... 198/841; 198/860.1
(58) Field of Search .............................. 198/841, 860.1, 198/861.1

(56) References Cited

U.S. PATENT DOCUMENTS

| | | | |
|---|---|---|---|
| 4,627,529 A | | 12/1986 | Tarlton et al. |
| 4,930,623 A | * | 6/1990 | Johnson et al. ............. 198/841 |
| 4,961,492 A | * | 10/1990 | Wiseman et al. ........... 198/841 |
| 4,967,897 A | * | 11/1990 | Lachonius et al. .......... 198/841 |
| 5,186,314 A | * | 2/1993 | Clopton .................... 198/860.2 |
| 5,316,134 A | * | 5/1994 | Donohue ................. 198/861.1 |
| 5,328,020 A | * | 7/1994 | Clopton .................... 198/861.1 |
| 5,489,020 A | | 2/1996 | Clopton |
| 5,788,056 A | * | 8/1998 | Clopton ........................ 198/841 |

FOREIGN PATENT DOCUMENTS

| | | |
|---|---|---|
| JP | 9-255126 | 9/1997 |
| JP | 2002-46831 | 2/2002 |

OTHER PUBLICATIONS

English Language Abstract of JP 9–255126.
E\nglish Language Abstract of JP 2002–46831.

* cited by examiner

*Primary Examiner*—Gene O. Crawford
(74) *Attorney, Agent, or Firm*—Greenblum & Bernstein, P.L.C.

(57) ABSTRACT

A track frame assembly to guide the conveyor chain or the like in a conveyor system is provided which includes at least a pair of frame members (A1), coupling block (10) and track rails (D). The frame member (A1) includes a base plate portion (1) and a pair of bent plate portions (2 and 4). The bent plate portions (2 and 4) have a plurality of cuts (5) formed therein nearly perpendicularly to the length thereof at predetermined intervals. When the base plate portion (1) is curbed in the direction of its thickness, the cuts (5) are deformed and the bent plate portions (2 and 4) are bent in the direction of their width, so that the frame members can be deformed easily and positively to a desired curved shape. Therefore, the track frame assembly is highly lightweight and rigid, simply configured, easy to produce and suitable for mass production, easy to handle and assemble. Thus the track frame assembly is optimally usable as a curved track portion in the conveyor system.

7 Claims, 10 Drawing Sheets

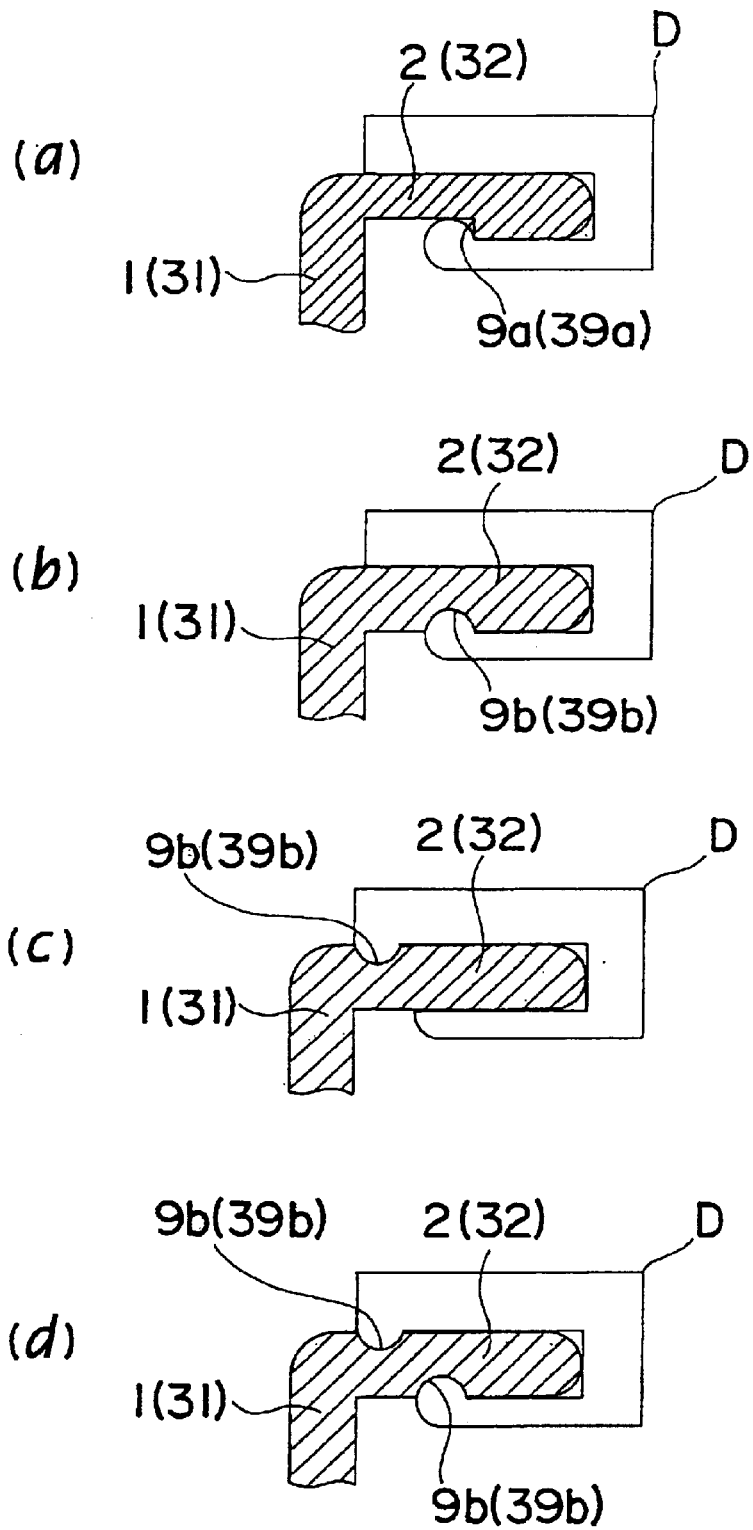

TRAVELING FRAME DEVICE IN CONVEYOR SYSTEM

FIELD OF THE INVENTION

The present invention generally relates to an apparatus for guiding a conveyor chain or the like in a conveyor system, which travels sliding thereon, and more particularly to a track frame assembly suitable for use as a curved track portion in a conveyor system.

BACKGROUND ART

In the track frame assembly of the above type, the frame member is formed from iron or stainless steel. The frame member is formed by bending a steel plate, for example, of a suitable thickness and proper length by a press or bender to make a simple long structure, and connecting a plurality of such structures to each other, for example. The conventional frame members include also a one made of aluminum by the extrusion molding by which the frame member can be formed to have any complicated shape as desired.

The curved track portion of the track frame assembly is formed by deforming a frame member to a desired curved shape.

In the above-mentioned conventional track frame assembly, however, it is difficult to deform a frame member easily and accurately to a desired curved shape.

That is, to work a frame member with an appropriate accuracy and assure an appropriate rigidity of the worked frame member, the frame member is made of a thick plate material or bent pieces are formed integrally with a base plate as a side plate, which makes it difficult to deform the frame member to a desired curved shape.

Also, in the above conventional track frame assembly, a guide bracket or the like is installed to the base plate as the side plate of the frame member with bolts inserted through fixing holes formed in the base plate. That is, the guide bracket can only be installed to the base plate in positions corresponding to the fixing holes. Thus, the installation of the guide bracket is limited to such a limited place, takes a good amount of time and cannot be efficient.

DISCLOSURE OF THE INVENTION

Accordingly, the present invention has an object to overcome the above-mentioned drawbacks of the conventional art by providing a track frame assembly whose frame member can be deformed easily and accurately to a desired curved shape suitable for use of the frame member as a curved track portion of a conveyor system, and which is easy to handle, lightweight and workable with a high accuracy to have a high rigidity, can be manufactured at low costs, is safe, easy to assemble, simply configured and suitable for mass production and inexpensive.

The above object can be attained by providing a track frame assembly for guiding a conveyor chain in a conveyor system, the assembly including according to the present invention as set forth in claim 1 given later:

at least a pair of frame members A1;

a coupling block 10 to couple the pair of frame members A1 to each other; and synthetic resin-made track rails D fitted on each frame member A1 and with which the conveyor chain is in sliding contact;

each of the frame members A1 being formed as a channel having a generally bracket-shaped section and consisting of an elongated base plate portion 1 and a pair of elongated bent plate portions 2 and 4 joined to opposite longitudinal edges, respectively, of the base plate portion 1 and extending generally perpendicularly to the base plate portion 1;

each of the bent plate portions 2 and 4 having a plurality of cuts 5 formed therein generally perpendicularly to the length thereof at predetermined intervals; and the cuts 5 being deformed, and bent plate portions 2 and 4 being bent in the direction of their width when the base plate portion 1 is bent in the direction of its thickness.

Since the frame member A1 can be deformed easily and accurately to a desired curved shape owing to the above construction, the above track frame assembly according to the present invention is optimally usable as a curved track portion in a conveyor system. Further, the track frame assembly is easy to handle, lightweight and workable with a high accuracy to have a high rigidity, can be manufactured at low costs, is safe, easy to assemble, simply configured and suitable for mass production and inexpensive.

Further, some or all of the plurality of cuts 5 are covered by the track rail D, so that the conveyor chain or the like is allowed to slide smoothly on the track frame assembly.

Also, the above object can be attained by providing a track frame assembly for guiding a conveyor chain in a conveyor system, the assembly including according to the present invention as set forth in claim 2 given later:

at least a pair of frame members A1;

a coupling block 10 to couple the pair of frame members A1 to each other; and synthetic resin-made track rails D fitted on each frame member A1 and with which the conveyor chain is in sliding contact;

each of the frame members A1 being formed as a channel having a generally bracket-shaped section and consisting of an elongated base plate portion 1 and a pair of elongated bent plate portions 2 and 4 joined to opposite longitudinal edges, respectively, of the base plate portion 1 and extending generally perpendicularly to the base plate portion 1;

one (2) of the bent plate portions 2 and 4 having joined to the lateral end thereof an elongated folded plate portion 3 extending toward the base plate portion 1, and each of the bent plate portions 2 and 4 and folded plate portion 3 having a plurality of cuts 5 formed therein generally perpendicularly to the length thereof at predetermined intervals; and the cuts 5 being deformed, and bent plate portions 2 and 4 and folded plate portion 3 being bent in the direction of their width, when the base plate portion 1 is bent in the direction of its thickness.

Since the frame member A1 can be deformed easily and accurately to a desired curved shape owing to the above construction, the above track frame assembly according to the present invention is optimally usable as a curved track portion in a conveyor system. Further, the track frame assembly is easy to handle, lightweight and workable with a high accuracy to have a high rigidity, can be manufactured at low costs, is safe, easy to assemble, simply configured and suitable for mass production and inexpensive.

Further, some or all of the plurality of cuts 5 are covered by the track rail D, so that the conveyor chain or the like is allowed to slide smoothly on the track frame assembly.

Also, the above object can be attained by providing a track frame assembly for guiding a conveyor chain in a conveyor system, the assembly including according to the present invention as set forth in claim 3 given later:

at least a pair of frame members A1;

a coupling block 10 to couple the pair of frame members A1 to each other;

synthetic resin-made track rails D fitted on each frame member A1 and with which the conveyor chain is in sliding contact; and an elongated reinforcing plate 20 pre-bent in the direction of its width;

each of the frame members A1 being formed as a channel having a generally bracket-shaped section and consisting of an elongated base plate portion 1 and a pair of elongated bent plate portions 2 and 4 joined to opposite longitudinal edges, respectively, of the base plate portion 1 and extending generally perpendicularly to the base plate portion 1;

one (2) of the bent plate portions 2 and 4 having joined to the lateral end thereof an elongated folded plate portion 3 extending toward the base plate portion 1, and each of the bent plate portions 2 and 4 and folded plate portion 3 having a plurality of cuts 5 formed therein generally perpendicularly to the length thereof at predetermined intervals;

the cuts 5 being deformed, and bent plate portions 2 and 4 and folded plate portion 3 being bent in the direction of their width, when the base plate portion 1 is bent in the direction of its thickness;

each track rail D being configured for fitting on one (2) of the bent plate portions 2 and 4 and folded plate portion 3 to cover their longitudinal edges, and flexible correspondingly to the curved state of the bent plate portion 2 and folded plate portion 3; and a reinforcing plate 20 pre-bent in the direction of its width being fixed on the other bent plate portion 4.

Since the frame member A1 can be deformed easily and accurately to a desired curved shape owing to the above construction, the above track frame assembly according to the present invention is optimally usable as a curved track portion in a conveyor system. Further, the track frame assembly is easy to handle, lightweight and workable with a high accuracy to have a high rigidity, can be manufactured at low costs, is safe, easy to assemble, simply configured and suitable for mass production and inexpensive.

More specifically, the track rail D is fitted on the bent plate portion 2 and folded plate portion 3 to cover their longitudinal edges and flexible correspondingly to the curved state of the bent plate portion 2 and folded plate portion 3. Thus, the cuts 5 in the longitudinal edges of the bent plate portion 2 and folded plate portion 3 can be positively covered by the track rail D, so that the worker attending the conveyor system will not possibly have the hand or finger injured by the longitudinal edges of the bent plate portion 2 and folded plate portion 3. Namely, a high safety can be assured to the workers around the conveyor system including the track frame assembly according to the present invention. The conveyor chain or the like can smoothly slide on the track rail D.

In addition, the reinforcing plate 20 pre-bent in the direction of its width and fixed on the other bent plate portion 4 enhances the strength and rigidity of the bent plate portion 4 and also maintains the curved state of the bent plate portion 4 positively. Thus, the track frame assembly can have an improved strength and rigidity and also maintain its curved state positively and accurately.

Also, the above object can be attained by providing a track frame assembly for guiding a conveyor chain in a conveyor system, the assembly including according to the present invention as set forth in claim 4 given later:

a pair of frame members A2;

a coupling clamp B to couple the pair of frame members A2 to each other; and synthetic resin-made track rails D fitted on each frame member A2 and with which the conveyor chain is in sliding contact;

each of the frame members A2 being formed as a channel having a generally bracket-shaped section and consisting of an elongated base plate portion 31 and a pair of elongated bent plate portions 32 joined to opposite longitudinal edges, respectively, of the base plate portion 31 and extending generally perpendicularly to the base plate portion 31;

the base plate portion 31 having a concavity 36 formed longitudinally, extending to positions of the bent plate portions 32 and consisting of a pair of elongated inclined plate portions 38 extending gradually divergent as they go toward their respective ends and an elongated concavity-bottom plate portion 37 disposed to connect the ends of the pair of inclined plate portions 38;

each of the bent plate portions 32 having joined to the longitudinal edge thereof an elongated folded plate portion 33 extending toward the base plate portion 31, and a plurality of cuts 35 being formed at predetermined intervals in, and generally perpendicularly to the length of, the bent plate portions 32, folded plate portions 33, inclined plate portions 38 and concavity-bottom plate portion 37; and the cuts 35 being deformed, bent plate portions 32, folded plate portions 33 and inclined plate portions 38 being bent in the direction of their width, and the concavity-bottom plate portion 37 being bent in the direction of its thickness, when the base plate portion 31 is bent in the direction of its thickness.

Since the frame member A2 can be deformed easily and accurately to a desired curved shape owing to the above construction, the above track frame assembly according to the present invention is optimally usable as a curved track portion in a conveyor system. Further, the track frame assembly is easy to handle, lightweight and workable with a high accuracy to have a high rigidity, can be manufactured at low costs, is safe, easy to assemble, simply configured and suitable for mass production and inexpensive.

Also, the above object can be attained by providing a track frame assembly for guiding a conveyor chain in a conveyor system, the assembly including according to the present invention as set forth in claim 5 given later:

a pair of frame members A2;

a coupling clamp B to couple the pair of frame members A2 to each other; and synthetic resin-made track rails D fitted on each frame member A2 and with which the conveyor chain is in sliding contact;

each of the frame members A2 being formed as a channel having a generally bracket-shaped section and consisting of an elongated base plate portion 31 and a pair of elongated bent plate portions 32 joined to opposite longitudinal edges, respectively, of the base plate portion 31 and extending generally perpendicularly to the base plate portion 31;

the base plate portion 31 having a concavity 36 formed longitudinally, extending to positions of the bent plate portions 32 and consisting of a pair of elongated inclined plate portions 38 extending gradually divergent as they go toward their respective ends and an elongated concavity-bottom plate portion 37 disposed to connect the ends of the pair of inclined plate portions 38;

each of the bent plate portions 32 having joined to the longitudinal edge thereof an elongated folded plate portion 33 extending toward the base plate portion 31, and a plurality of cuts 35 being formed at predetermined intervals in, and generally perpendicularly to the length of, the bent plate portions 32, folded plate portions 33, inclined plate portions 38 and concavity-bottom plate portion 37;

the cuts 35 being deformed, bent plate portions 32, folded plate portions 33 and inclined plate portions 38 being bent in the direction of their width, and the concavity-bottom plate portion 37 being bent in the direction of its thickness, when the base plate portion 31 is bent in the direction of its thickness; and each track rail D being configured for fitting on the bent plate portion 32 and folded plate portion 33 to cover their longitudinal edges, and flexible correspondingly to the curved state of the bent plate portion 32 and folded plate portion 33.

Since the frame member A2 can be deformed easily and accurately to a desired curved shape owing to the above construction, the above track frame assembly according to the present invention is optimally usable as a curved track portion in a conveyor system. Further, the track frame assembly is easy to handle, lightweight and workable with a high accuracy to have a high rigidity, can be manufactured at low costs, is safe, easy to assemble, simply configured and suitable for mass production and inexpensive.

More specifically, each track rail D is fitted on the bent plate portion 32 and folded plate portion 33 to cover their longitudinal edges and flexible correspondingly to the curved state of the bent plate portion 32 and folded plate portion 33. Thus, the cuts 35 in the longitudinal edges of the bent plate portion 32 and folded plate portion 33 can be positively covered by each track rail D, so that the worker attending the conveyor system will not possibly have the hand or finger injured by the longitudinal edges of the bent plate portions 32 and folded plate portion 33. Namely, a high safety can be assured to the workers around the conveyor system including the track frame assembly according to the present invention. The conveyor chain or the like can smoothly slide on the track rail D.

Also the above object can be attained by providing the track frame assembly according to claim 4 or 5, wherein, as set forth in claim 6 given later:

the coupling clamp B includes a pair of clamps 40 and a fastener to couple the pair of clamps 50 by attracting them toward each other; and each of the clamps 50 has formed at either end thereof an engagement portion 44 to catch each bottom corner of the concavity 36 of each of the pair of frame members A2.

Because of the above construction, the pair of frame members A2 can be coupled to each other simply, positively and securely by the coupling clamps B. The coupling clamps B serve as a space to keep constant the distance between the pair of frame members A2 while fastening the latter. Thus, the present invention can provide a track frame assembly having a high working accuracy. Therefore, the conveyor chain E can easily be fitted to the track frame assembly, and can be prevented by the track frame assembly from displacing laterally.

These objects and other objects, features, and advantages of the present invention will become more apparent from the following detailed description of the preferred embodiments of the present invention when taken in conjunction with the accompanying drawings. It should be noted that the present invention is not limited to the embodiments but can freely be modified without departing from the scope and spirit thereof defined in the claims given later.

BRIEF DESCRIPTION OF THE DRAWINGS

FIG. 6 is also a fragmentary side elevation of the track frame assembly in FIG. 1.

FIGS. 10(*a*) to 10(*d*) are partial sectional views of variants of the folded plate portion of the track frame assembly in FIG. 7.

BEST MODE FOR CARRYING OUT THE INVENTION

Figure 1:
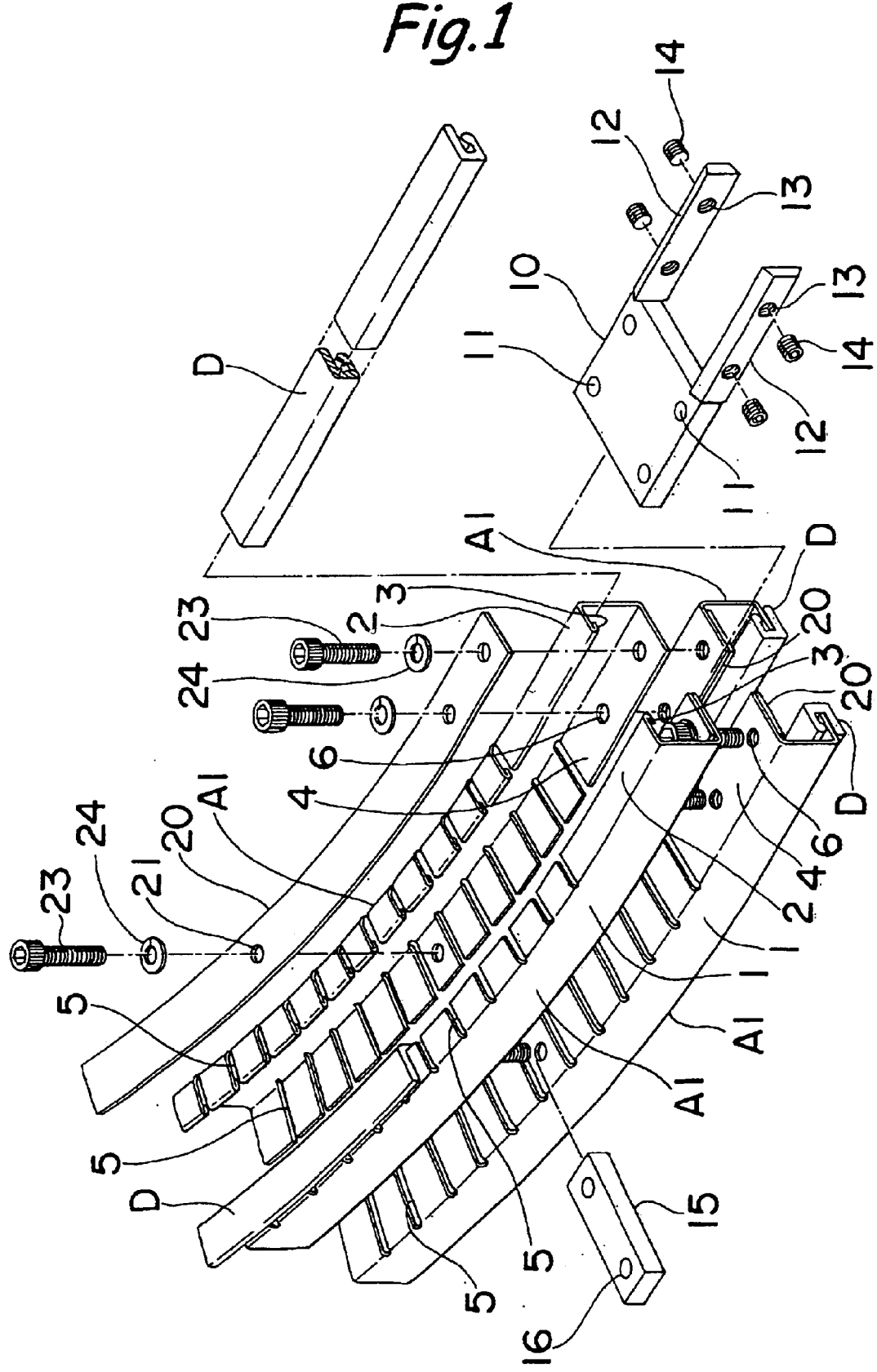
FIG. 1 is a partially cut-away, exploded perspective view of one embodiment of the track frame assembly according to the present invention.
Figure 2:
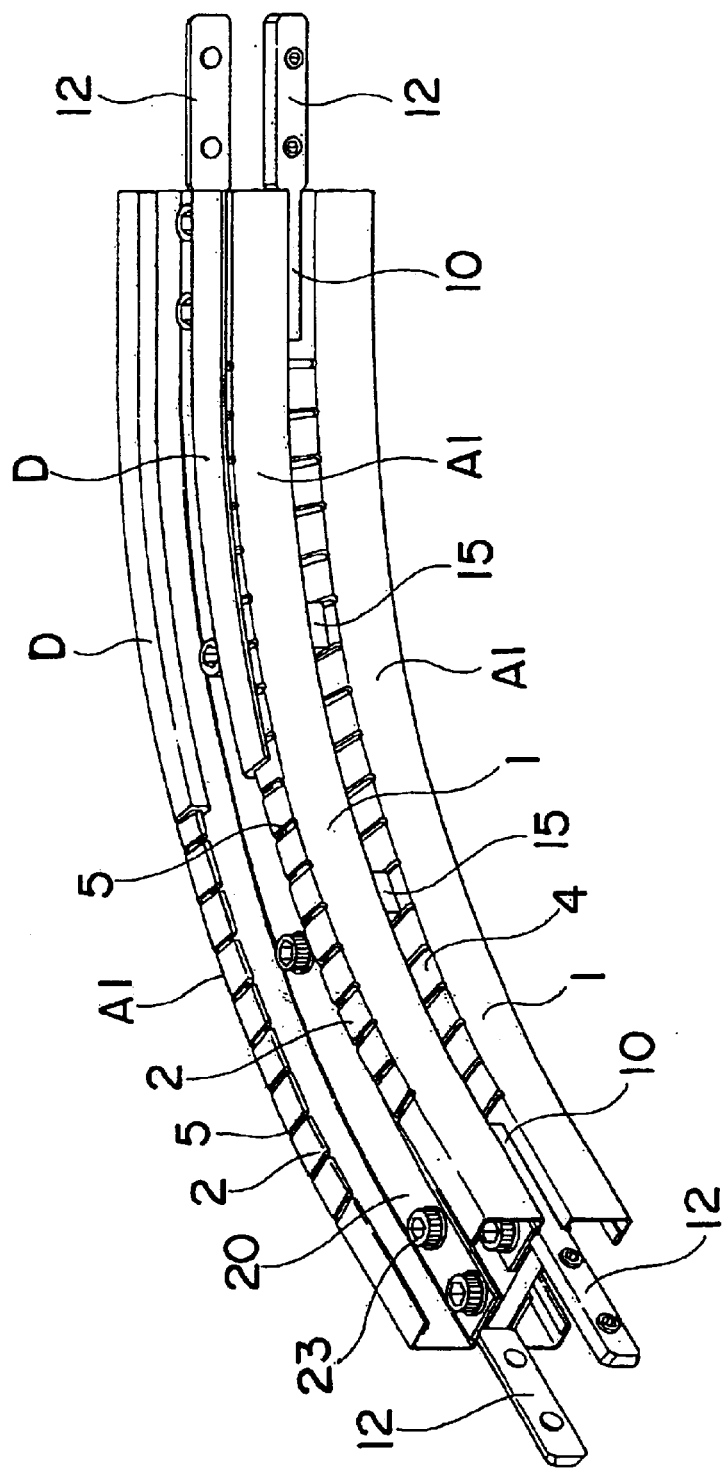
FIG. 2 is a partially cut-away perspective view of the track frame assembly in FIG. 1.
Figure 3:
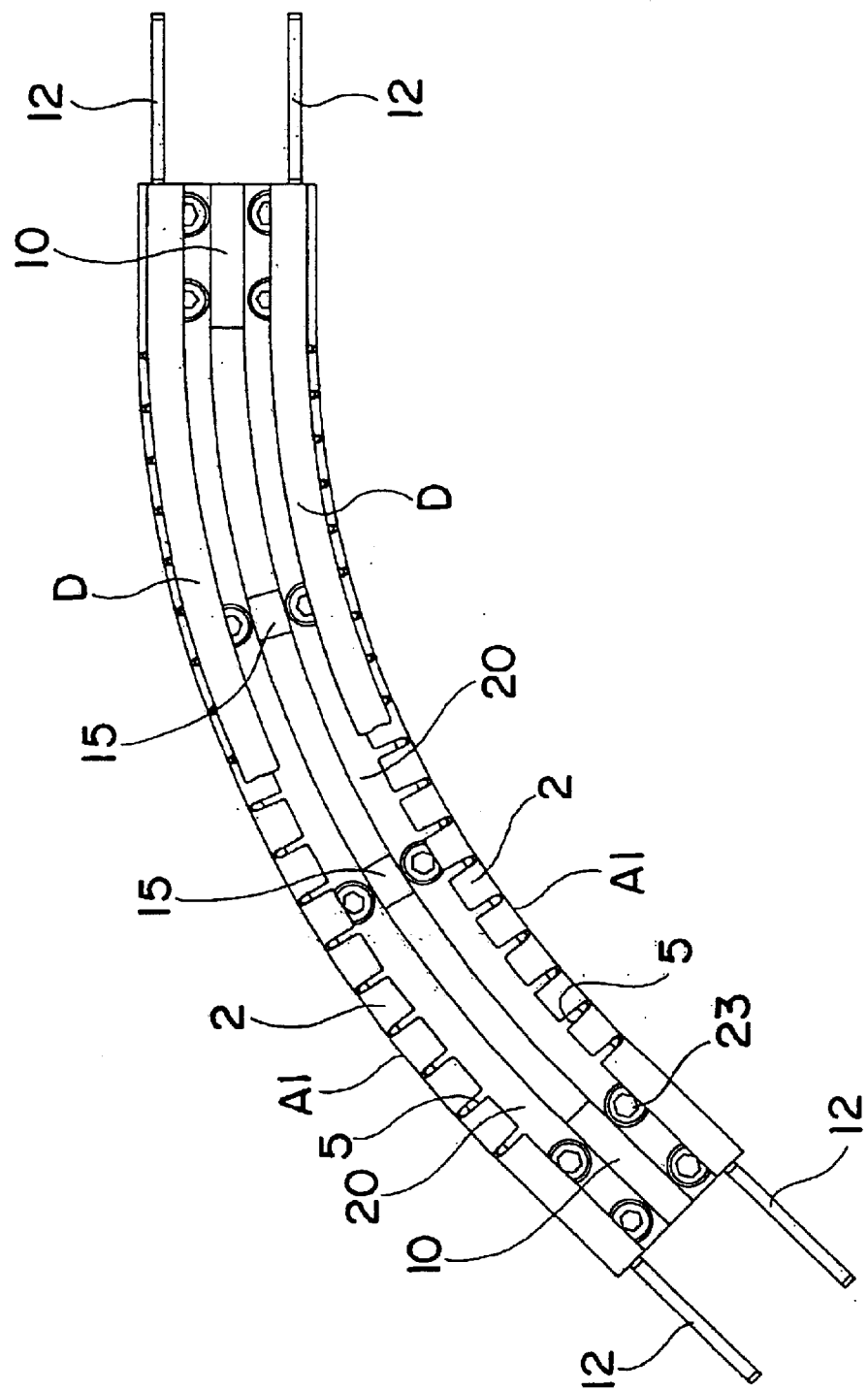
FIG. 3 is a partially cut-away plan view of the track frame assembly in FIG. 1.
Figure 4:
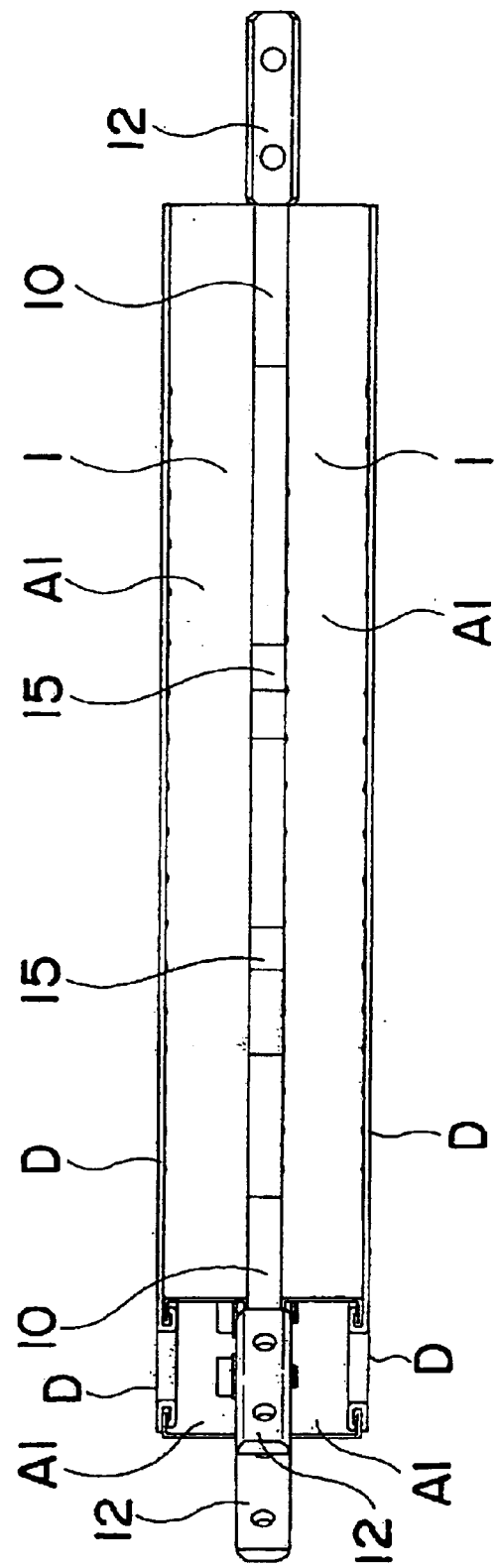
FIG. 4 is a partially cut-away front view of the track frame assembly in FIG. 1.
Figure 5:
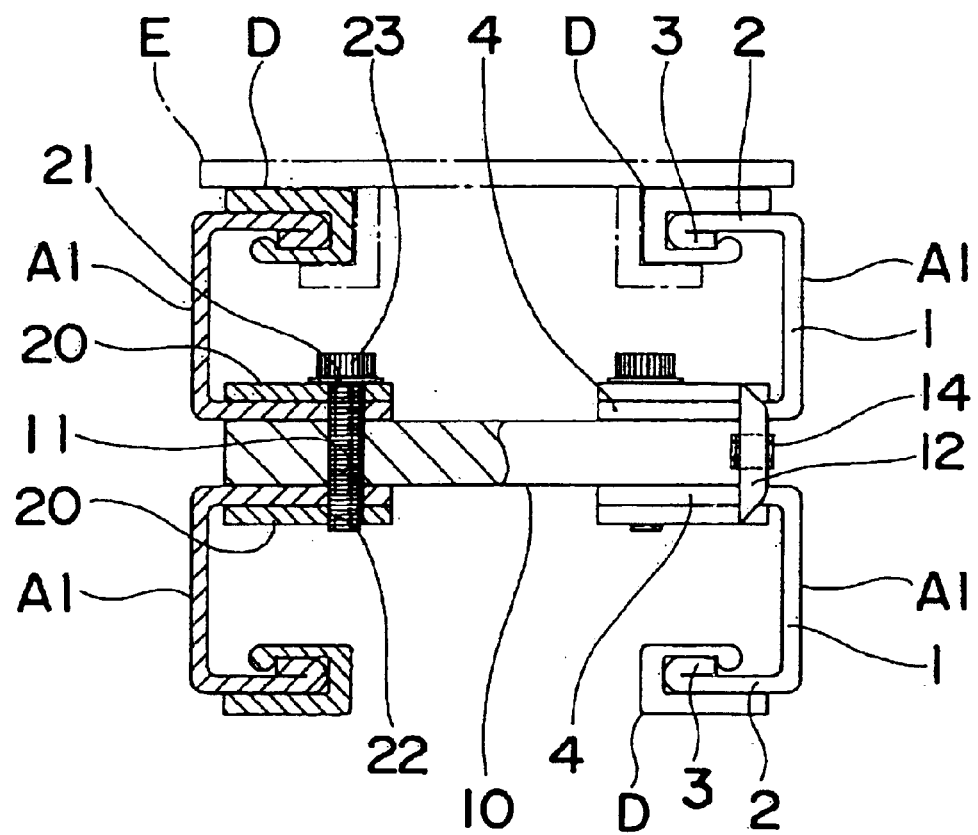

Through FIGS. 1 to 6, a frame member used in the track frame assembly according to the present invention, to hold a conveyor chain E or the like slidably is indicated with a reference A1.

The frame member A1 is formed from an appropriately long steel plate, for example. More particularly, the frame member A1 is shaped as a channel having a generally bracket-shaped section and consists of an elongated base plate portion 1 and a pair of elongated bent plate portions 2 and 4 joined to opposite longitudinal edges, respectively, of the base plate portion 1 and extending generally perpendicularly to the base plate portion 1.

Further, one (2) of the bent plate portions 2 and 4 has joined to the lateral end thereof an elongated folded plate portion 3 extending toward the base plate portion 1, and each of the bent plate portions 2 and 4 and folded plate portion 3 has a plurality of cuts 5 formed therein generally perpendicularly to the length thereof at predetermined intervals. Thus, when the base plate portion 1 is bent in the direction of its thickness, the cuts 5 are deformed (for example, each of the cuts 5 will be narrowed or widened at the free end thereof) and the bent plate portions 2 and 4 and folded plate portion 3 are bent in the direction of their width.

That is to say, the cuts 5 are provided to weaken the maximum resistance of the bent plate portions 2 and 4 and folded plate portion 3 being bent in the direction of their width when the frame member A1 is bent.

Note that since the corner where the base plate portion 1 and one bent plate portion 2 are contiguous to each other, a one where the base plate portion 1 and other bent plate portion 4 are contiguous to each other, and a one where the bent plate portion 2 and folded plate portion 3 are contiguous to each other, are rounded, so they will not injure the worker in handling and installing the frame members. Also, to prevent water or the like from staying at such corners, appropriate through-holes may be formed in the corners so that the water or the like, if any, will not stay there.

The base plate portion 1 is generally an elongated band plate, for example, and disposed for the surface thereof to be vertical. It should be noted that the base plate portion 1 may have the surface thereof disposed at any selected angle.

Each of the bent plate portions 2 and 4 in pair is generally an elongated band plate, for example, and they are joined generally perpendicularly to the longitudinal edges, respectively, of the base plate portion 1 to be parallel to each other. It should be noted that the pair of bent plate portions 2 and 4 may be joined to the base plate portion 1 at any angle other than the right angle and they may not be parallel to each other.

The folded plate portion 3 is formed narrower than the one bent plate portion 2, and disposed inside the latter. The folded plate portion 3 may be or may not be in close contact with the bent plate portion 2.

The cuts 5 is formed generally like an elongated "U", for example, and extend across the bent plate portions 2 and 4 and folded plate portion 3. It should be noted that the wider the cut 5 or the smaller the cut interval, the smaller radius of curvature the frame member A1 can have when bent.

The reference 10 indicates a coupling block formed from a thick plate having a generally rectangular shape, for example. The coupling block 10 has formed therein through-holes 11. The frame members A1 in pair are fixed to the upper and lower sides, respectively, of the coupling block 10 with fixing screws 23 or the like inserted in through the through-holes 11.

That is, as in the illustrated embodiment, four frame members A1 are fixed at the ends thereof to the coupling block 10 with one of the frame members A1 in pair being fixed to the upper side of the coupling block 10 while the other frame member A1 is fixed upside down to the lower side.

Further, as in the illustrated embodiment, the coupling block 10 has a pair of coupling projections 12 joined to the right and left ends, respectively, thereof. As shown, each of the coupling projections 12 has internally threaded holes 13 in which set screws 14 are to be screwed.

Namely, the pair of coupling projections 12 is provided to couple the coupling block 10 to another frame member of the track frame assembly. For example, it is to be inserted into a concavity 36 of a frame member A2 in another embodiment of the present invention.

The reference 15 indicates a reinforcing block formed from a generally elongated rectangular thick plate. The reinforcing block 15 has through-holes 16 formed therein, and the frame members A1 in pair are to be fixed to the upper and lower sides, respectively, of the reinforcing block 15 with fixing screws 23 inserted in the through-holes 16.

That is, as in the illustrated embodiment, four frame members A1 are fixed at the intermediate portions thereof to the reinforcing block 15 with one of the frame members A1 in pair being fixed to the upper side of the reinforcing block 15 while the other frame member A1 is fixed upside down to the lower side.

Note that an appropriate internally threaded hole may be preformed in each of the lateral end faces of the reinforcing block 15 for installation of a guide bracket, sensor or the like with a fixing screw.

Figure 6:
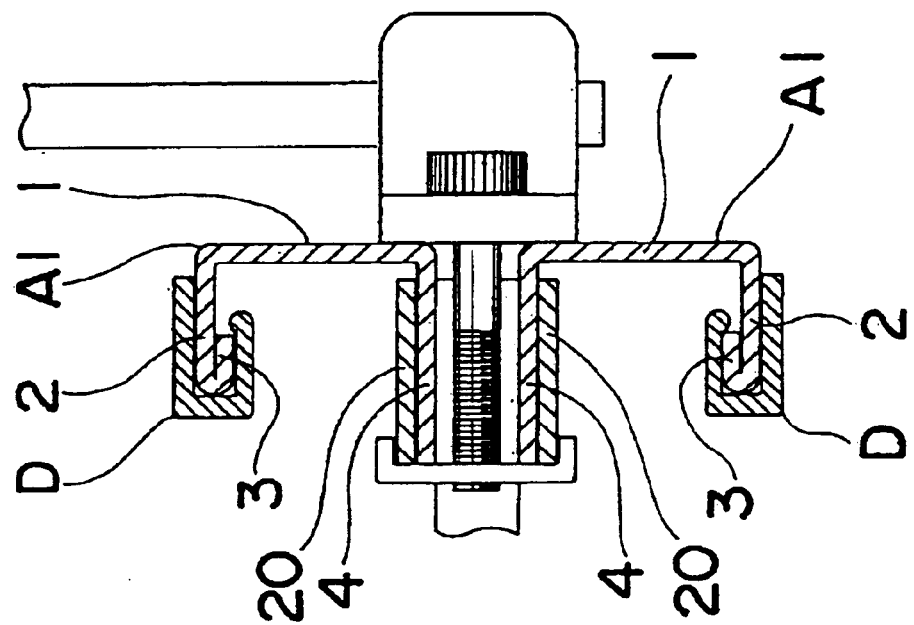
FIG. 6 is a fragmentary side elevation of the track frame assembly in FIG. 1.

Also, a guide bracket, sensor or the like may be installed in a desired position in the space between the upper pair of frame members A1 and lower pair of frame members A1 with a generally C-shaped fixture extending the upper pair of frame members A1 and lower pair of frame members A1 and a fixing screw (as shown in FIG. 6).

The reference 20 indicates a reinforcing plate formed from an elongated circular metal plate bent in the direction of its width in advance. The reinforcing plate 20 is shaped for use on the inner surface of the bent plate portion 4.

Note that the reinforcing plate 20 has formed in place therein through-holes 21 through which the fixing screws 23 are inserted, and internally threaded holes 22 in which the fixing screws 23 are screwed to positively maintain the curved state of the bent plate portion 4 and enhance the strength and rigidity of the bent plate portion 4.

Note that all the internally threaded holes 22 formed in the reinforcing plate 20 may be through-holes like the holes 21 and replaced with nuts which are to be fitted on the fixing screws 23. The reference 24 indicates a washer which prevents the fixing screw 23 from being loosened.

The reference D indicates a track rail made of an appropriate synthetic resin, which is to be attached to the frame member A1 and with which the conveyor chain E or the like is in sliding contact. The track rail D is attached to the frame member A1 to cover the longitudinal free edges of the bent plate portion 2 and folded plate portion 3. Also, the track rail D is flexible correspondingly to the curved state of the bent plate portion 2 and folded plate portion 3 and in contact with the conveyor chain E to assure a smoother sliding of the conveyor chain E on the track rail D.

Note here that the following are not limited to the aforementioned and illustrated ones but may be appropriately set and modified without departing from the scope, defined by claims given later, of the present invention:

Concrete construction, shape, dimensions and material of the frame member A1;

Concrete construction, shape, angle relative to the base plate portion 1;

Concrete construction, shape and dimensions of the bent plate portions 2 and 4;

Concrete construction, shape, dimensions and location of the folded plate portion 3;

Concrete construction, shape, dimensions, location, interval and number of the cuts 5;

Concrete construction, shape, dimensions, location and number of the through-holes 6;

Concrete construction, shape, dimensions and material of the coupling block 10;

Concrete construction, shape, dimensions, location and number of the through-holes 11;

Concrete construction, shape, dimensions, material and location of the coupling projection 12;

Concrete construction, shape, dimensions, location and number of the internally threaded holes 13;

Concrete construction, shape, dimensions, material, and number of the set screws 14;

Concrete construction, shape, dimensions, material, number and location of the reinforcing blocks 15;

Concrete construction, shape, dimensions, location and number of through-holes 16;

Concrete construction, shape, dimensions, and material of the reinforcing plate 20;

Concrete construction, shape, dimensions, location and number of the through-holes 21;

Concrete construction, shape, dimensions, location and number of the internally threaded holes 22;

Concrete construction, shape, dimensions, and material of the fixing screw 23;

Concrete construction, shape, dimensions, and material of the washers 24; and

Concrete construction, shape, dimensions, and material of the track rail D.

Figure 7:
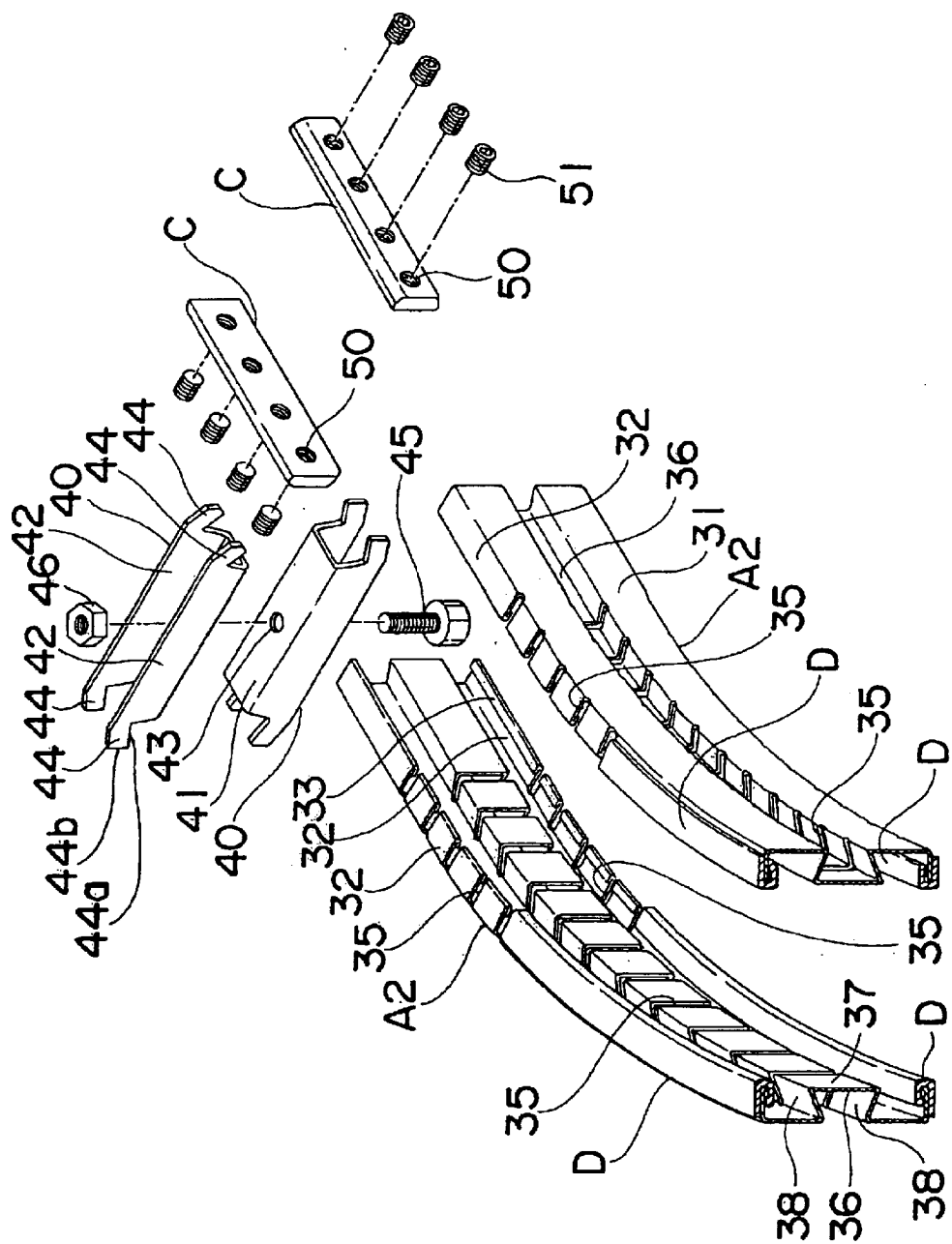
FIG. 7 is a partially cut-away, exploded perspective view of another embodiment of the track frame assembly according to the present invention.
Figure 8:
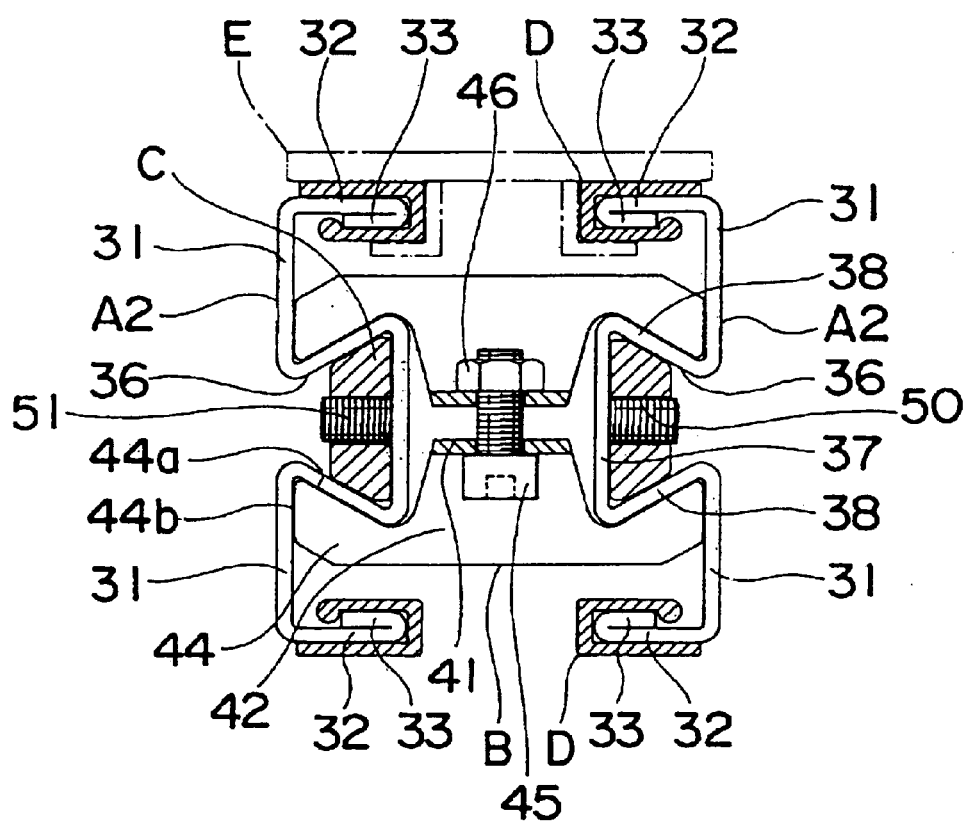
FIG. 8 is an axial-sectional side elevation of the track frame assembly in FIG. 7.
Figure 9:
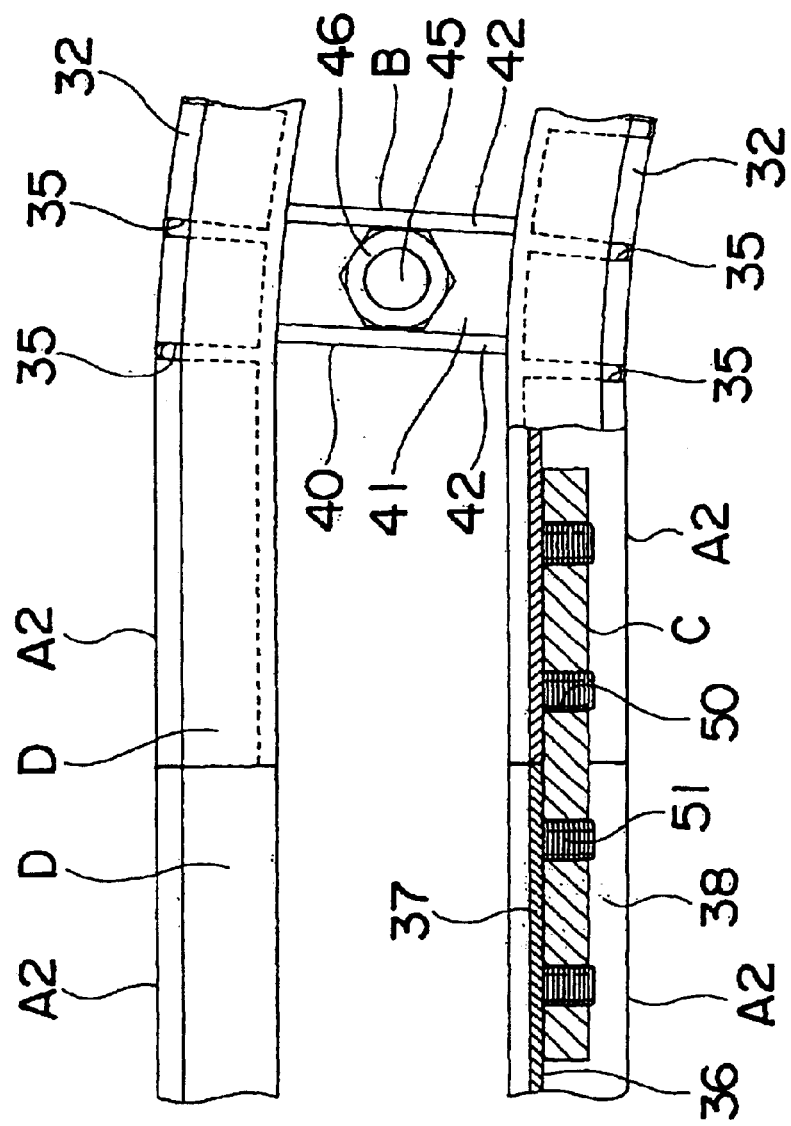
FIG. 9 is a fragmentary plan view of the track frame assembly in FIG. 7.

FIGS. 7 to 9 shows another embodiment of the track frame assembly according to the present invention. The second embodiment of the track frame assembly includes a pair of metallic frame members A2, a suitable number of coupling clamps B to couple the pair of frame members A2 together to be parallel and opposite to each other, and track rails D attached to the frame members A2.

Each of the coupling clamps B includes a pair of clamp bodies 40 and a fastener to couple the pair of clamp bodies 40 and fasten them toward each other. Each of the clamp bodies 40 in pair has provided at either free end thereof an engagement portion 44 shaped to catch each bottom corner of a concavity 36 of each of the frame members A2 in pair.

The frame member A2 used in this embodiment of the track frame assembly is formed from an appropriately long steel plate, for example. More specifically, it is formed as a channel consisting of an elongated base plate portion 31 and a pair of elongated bent plate portions 32 joined to opposite longitudinal edges, respectively, of the base plate portion 31 and extending generally perpendicularly to the base plate portion 31. The base plate portion 31 has a concavity 36 formed longitudinally and extending to positions of the bent plate portions 32 and consisting of a pair of elongated inclined plate portions 38 extending gradually divergent as they go toward their respective ends and an elongated concavity-bottom plate portion 37 disposed to connect the ends of the pair of inclined plate portions 38.

Further, each of the bent plate portions 32 has joined to the longitudinal edge thereof an elongated folded plate portion 33 extending toward the base plate portion 31.

A plurality of cuts 35 is formed at predetermined intervals in, and generally perpendicularly to the length of, the bent plate portions 32, folded plate portions 33, inclined plate portions 38 and concavity-bottom plate portion 37. When the base plate portion 31 is bent in the direction of its thickness, the cuts 35 are deformed (for example, each of the cuts 35 will be narrowed or widened at the free end thereof) and bent plate portions 32, folded plate portions 33, inclined plate portions 38 are bent in the direction of their width and the concavity-bottom plate portion 37 is bent in the direction of its thickness.

That is to say, the cuts 35 are provided to weaken the maximum resistance of the bent plate portions 32, folded plate portion 33, inclined plate portions 38 and the concavity-bottom plate portion 37 being bent in the direction of their width when the frame member A2 is bent.

Note that since the corner where the base plate portion 31 and bent plate portion 32 are contiguous to each other, ones where the base plate portion 31 and inclined plate portions 38 are contiguous to each other, a one where the inclined plate portion 38 and concavity-bottom plate portion 37 are contiguous to each other, and a one where the bent plate portion 32 and folded plate portion 33 are contiguous to each other, are rounded, so they will not injure the worker in handling and installing the frame members. Also, to prevent water or the like from staying at such corners, appropriate through-holes may be formed in the corners so that the water or the like, if any, will not stay there.

The base plate portion 31 is generally an elongated band plate, for example, and disposed for the surface thereof to be vertical. It should be noted that the base plate portion 31 may have the surface thereof disposed at any selected angle.

Each of the bent plate portions 32 is generally an elongated band plate, for example, and they are joined generally perpendicularly to the longitudinal edges, respectively, of the base plate portion 31 to be parallel to each other. It should be noted that the pair of bent plate portions 32 may be joined to the base plate portion 31 at any angle other than the right angle and they may not be parallel to each other.

The folded plate portion 33 is formed narrower than the bent plate portion 32, and disposed inside the latter. The folded plate portion 33 may be or may not be in close contact with the bent plate portion 32.

The cuts 35 is formed generally like an elongated "U", for example, and extend across the bent plate portions 32, folded plate portion 33, inclined plate portion 38 and concavity-bottom plate portion 37.

It should be noted that the wider the cut 35 or the smaller the cut interval, the smaller radius of curvature the frame member A1 can have when bent.

The concavity 36 has an opening of a larger size than a bolt and nut can be introduced. It may be provided in the lateral center of the base plate portion 31 or a plurality of such concavities may be provided in the direction of the width of the base plate portion 31 at predetermined intervals (not shown).

The clamp body 40 of the coupling clamp B consists of a rectangular base plate portion 41 having a through-hole 43 formed in the center thereof, and a pair of rising plate portions 42 joined to the lateral ends of the base plate portion 41. Each of the rising plate portions 42 in pair has formed at either end thereof an engagement portion 44 which can be engaged on the bottom corner of the concavity 36. The engagement portion 44 has an inclined edge 44a which abuts the inclined plate portion 38, and a free end 44b which abuts the base plate portion 31.

Namely, when the fastener penetrated through the pair of clamp bodies 40 is tightened, the inclined plate portions 44a of the engagement portions 44 force the pair of inclined plate portions 43b (of the concavity 36) of the frame member A2 while moving the pair of frame members A2 toward each other until the base plate portions 31 abut free ends 44b of the engagement portions 44. Thus, the pair of frame members A2 is spaced a predetermined distance (length of the clamp body 40) from each other by the free ends 44b of the engagement portion 44. That is, the clamp body 40 itself serves as a spacer.

Note that the clamp body 40 is formed such that when the inclined edges 44a press the pair of inclined plate portions 38 to move the pair of frame members A2 toward each other, the base plate portion 41 and rising plate 42 of the clamp body 40 will not abut the concavity-bottom plate portion 37, namely, the base plate portion 31 will not abut the free ends 44b.

Also, the corner formed between the inclined edge 44a and end 14b of the engagement portion 44 is shaped to define some space with a corner formed between the base plate portion 31 and inclined plate portion 38 of the frame member A2. Namely, the space is provided to allow free flow of any water or dust, if any, at the corner formed between the base plate portion 31 and inclined plate portion 38.

The aforementioned fastener includes a bolt 45 which can be inserted through the through-hole 43 in the clamp body 40 (hex. socket head bolt, for example) and a nut 46. It may be any one which could securely couple the pair of clamp bodies 40 and force the latter toward each other.

Note that the nut 46 may be a one which can be received between the pair of rising plate portions 42 of the clamp body 40 and thus blocked against rotation by the rising plate portions 42.

The reference C indicates a joint member to couple adjacent frame members A2. The joint member C is formed from a thick metal plate, for example. The joint member C has a plurality (four, for example) of internally threaded holes 50 formed at predetermined intervals longitudinally of the joint member C. Also, the joint member C is shaped to have such a cross section as nearly fits the profile, nearer to the concavity-bottom plate portion 37, of the concavity 36. More particularly, the joint member C has inclined lateral edges which are in contact with the pair of inclined plate portions 38 when it is placed nearer to the concavity-bottom plate portion 37 of the concavity 36.

More specifically, the joint member C is so shaped as to stably be inserted into the concavity 36 of the frame member A2 and that when the concavity-bottom plate portion 37 of the concavity 36 is pressed by the end of a fixing screw 51 screwed into the internally threaded hole 50, the joint member C can be fixed to the frame member A2 with the inclined lateral edges thereof being in closed contact with the inclined plate portions 38 of the concavity 36, whereby the adjacent frames A2 can be coupled to each other accurately and positively without being displaced relatively to each other.

Note that the joint member C is shaped to define some space with the corner formed between the concavity-bottom plate portion 37 and inclined plate portion 38 (of the concavity 36) of the frame member A2. Namely, the space is provided to allow free flow of any water or dust, if any, at the corner formed between the concavity-bottom plate portion 37 and inclined plate portion 38 of the concavity 36. It should be noted here that also the coupling projections 12 should preferably be formed similarly to the joint member C.

The track rail D to be attached to the above-mentioned frame member A2 is formed from an appropriately elastic synthetic resin. The track rail D is attached to the frame member A2 to cover the longitudinal free edges of the bent plate portions 32 and doubling plate 33. Also, the track rail D is flexible correspondingly to the curved state of the bent plate portions 32 and folded plate portion 33 and in contact with the conveyor chain E to assure a smoother sliding of the conveyor chain E on the track rail D.

Note here that the following are not limited to the aforementioned and illustrated ones but may be appropriately set and modified without departing from the scope, defined by claims given later, of the present invention:

Concrete construction, shape, dimensions and material of the frame member A2;

Concrete construction, shape, angle relative to the base plate portion 31;

Concrete construction, shape and dimensions of the bent plate portions 32;

Concrete construction, shape, dimensions and location of the folded plate portion 33;

Concrete construction, shape, dimensions, location, interval and number of the cuts 35;

Concrete construction, shape, dimensions, location and number of the through-holes 36;

Concrete construction, shape and dimensions of the concavity-bottom plate portion 37;

Concrete construction, shape, dimensions and disposed state of the inclined plate portions 38;

Concrete construction, shape, dimensions and material of the coupling clamp B;

Concrete construction, shape, dimensions, material, location and number of the clamp bodies 40;

Concrete construction, shape and dimensions of the base plate portion 41;

Concrete construction, shape and dimensions of the rising plate portions 42;

Concrete construction, shape, dimensions, location and number of the through-holes 43;

Concrete construction, shape and dimensions of the engagement portions 44;

Concrete construction, shape and dimensions of the inclined edges 44a;

Concrete construction, shape and dimensions of the free ends 44b;

Concrete construction, shape, dimensions and material of the fastener;

Concrete construction, shape, dimensions and material of the joint member C;

Concrete construction, shape, dimensions, location and number of the internally threaded holes 50;

Concrete construction, shape, dimensions, material, and number of the fixing screws 51; and Concrete construction, shape, dimensions, and material of the track rail D.

Note that the frame member A1 (A2) may be formed by extrusion molding of aluminum, for example. In this case, an engagement step 9a (39a) and engagement concavity 9b (39b) are formed on the upper or lower side of the bent plate portions 2 (32), as shown in FIG. 10, for the engagement projections on the track rail D to engage on such step or concavity simply and positively.

Also, the track rail D may be attached to the frame member A1 (A2) by directing the opening of the track rail D toward the boundary between the bent plate portion 2 (32) and folded plate portion 3 (33) of the frame member A1 (A2) (or the longitudinal end of the bent plate portion 2 (32)) and forcibly pressing the track rail D until the engagement projection engages the end of the folded plate portion 3 (33) (or the engagement projection 9a (39a) and engagement concavity 9b (39b)). Otherwise, the track rail D may be attached by inserting the longitudinal end thereof from the longitudinal end of the boundary between the bent plate portion 2 (32) and folded plate portion 3 (33) of the frame member A1 (A2) (or the longitudinal edge of the bent plate portion 2 (32)).

Industrial Applicability

As having been described in the foregoing, solving the problem that the conventional frame member making up a curved track portion of a conveyer system cannot be deformed easily and positively to a desired curved shape, the present invention provides a track frame assembly for guiding a conveyor chain in the conveyor system, highly lightweight and rigid, simply configured, easy to produce and suitable for mass production, easy to handle and assemble, and optimally usable as a curved track portion in the conveyor system.

What is claimed is:

1. A track frame assembly for guiding a conveyor chain in a conveyor system, the assembly comprising:
   at least a pair of frame members;
   a coupling block to couple the pair of frame members to each other; and synthetic resin-made track rails fitted on each frame member and with which the conveyor chain is in sliding contact;

each of the frame members being formed as a channel having a generally bracket-shaped section and consisting of an elongated base plate portion and a pair of elongated bent plate portions joined to opposite longitudinal edges, respectively, of the base plate portion and extending generally perpendicularly to the base plate portion;

each of the bent plate portions having a plurality of cuts formed therein generally perpendicularly to the length thereof at predetermined intervals; and the cuts being deformed, and bent plate portions being bent in the direction of their width, when the base plate portion is bent in the direction of its thickness.

2. A track frame assembly for guiding a conveyor chain in a conveyor system, the assembly comprising:

at least a pair of frame members;

a coupling block to couple the pair of frame members to each other; and synthetic resin-made track rails fitted on each frame member and with which the conveyor chain is in sliding contact;

each of the frame members being formed as a channel having a generally bracket-shaped section and consisting of an elongated base plate portion and a pair of elongated bent plate portions joined to opposite longitudinal edges, respectively, of the base plate portion and extending generally perpendicularly to the base plate portion;

one of the bent plate portions having joined to the lateral end thereof an elongated folded plate portion extending toward the base plate portion, and each of the bent plate portions and folded plate portion having a plurality of cuts formed therein generally perpendicularly to the length thereof at predetermined intervals; and the cuts being deformed, and bent plate portions and folded plate portion being bent in the direction of their width, when the base plate portion is bent in the direction of its thickness.

3. A track frame assembly for guiding a conveyor chain in a conveyor system, the assembly comprising:

at least a pair of frame members;

a coupling block to couple the pair of frame members to each other;

synthetic resin-made track rails fitted on each frame member and with which the conveyor chain is in sliding contact; and an elongated reinforcing plate pre-bent in the direction of its width;

each of the frame members being formed as a channel having a generally bracket-shaped section and consisting of an elongated base plate portion and a pair of elongated bent plate portions joined to opposite longitudinal edges, respectively, of the base plate portion and extending generally perpendicularly to the base plate portion;

one of the bent plate portions having joined to the lateral end thereof an elongated folded plate portion extending toward the base plate portion, and each of the bent plate portions and folded plate portion having a plurality of cuts formed therein generally perpendicularly to the length thereof at predetermined intervals;

the cuts being deformed, and bent plate portions and folded plate portion being bent in the direction of their width, when the base plate portion is bent in the direction of its thickness;

each track rail being configured for fitting on one of the bent plate portions and folded plate portion to cover their longitudinal edges, and flexible correspondingly to the curved state of the bent plate portion and folded plate portion; and a reinforcing plate pre-bent in the direction of its width being fixed on the other bent plate portion.

4. A track frame assembly for guiding a conveyor chain in a conveyor system, the assembly comprising:

a pair of frame members;

a coupling clamp to couple the pair of frame members to each other; and synthetic resin-made track rails fitted on each frame member and with which the conveyor chain is in sliding contact;

each of the frame members being formed as a channel having a generally bracket-shaped section and consisting of an elongated base plate portion and a pair of elongated bent plate portions joined to opposite longitudinal edges, respectively, of the base plate portion and extending generally perpendicularly to the base plate portion;

the base plate portion having a concavity formed longitudinally, extending to positions of the bent plate portions and consisting of a pair of elongated inclined plate portions extending gradually divergent as they go toward their respective ends and an elongated concavity-bottom plate portion disposed to connect the ends of the pair of inclined plate portions;

each of the bent plate portions having joined to the longitudinal edge thereof an elongated folded plate portion extending toward the base plate portion, and a plurality of cuts being formed at predetermined intervals in, and generally perpendicularly to the length of, the bent plate portions, folded plate portions, inclined plate portions and concavity-bottom plate portion; and the cuts being deformed, bent plate portions, folded plate portions and inclined plate portions being bent in the direction of their width, and the concavity-bottom plate portion being bent in the direction of its thickness, when the base plate portion is bent in the direction of its thickness.

5. The track frame assembly according to claim 4, wherein:

the coupling clamp includes a pair of clamps and a fastener to couple the pair of clamps by attracting them toward each other; and each of the clamps has formed at either end thereof an engagement portion to catch each bottom corner of the concavity of each of the pair of frame members.

6. A track frame assembly for guiding a conveyor chain in a conveyor system, the assembly comprising:

a pair of frame members;

a coupling clamp to couple the pair of frame members to each other; and synthetic resin-made track rails fitted on each frame member and with which the conveyor chain is in sliding contact;

each of the frame members being formed as a channel having a generally bracket-shaped section and consisting of an elongated base plate portion and a pair of elongated bent plate portions joined to opposite longitudinal edges, respectively, of the base plate portion and extending generally perpendicularly to the base plate portion;

the base plate portion having a concavity formed longitudinally, extending to positions of the bent plate portions and consisting of a pair of elongated inclined plate portions extending gradually divergent as they go toward their respective ends and an elongated concavity-bottom plate portion disposed to connect the ends of the pair of inclined plate portions;

each of the bent plate portions having joined to the longitudinal edge thereof an elongated folded plate portion extending toward the base plate portion, and a plurality of cuts being formed at predetermined intervals in, and generally perpendicularly to the length of, the bent plate portions, folded plate portions, inclined plate portions and concavity-bottom plate portion;

the cuts being deformed, bent plate portions, folded plate portions and inclined plate portions being bent in the direction of their width, and the concavity-bottom plate portion being bent in the direction of its thickness, when the base plate portion is bent in the direction of its thickness; and each track rail being configured for fitting on the bent plate portion and folded plate portion to cover their longitudinal edges, and flexible correspondingly to the curved state of the bent plate portion and folded plate portion.

7. The track frame assembly according to claim 6, wherein:

the coupling clamp includes a pair of clamps and a fastener to couple the pair of clamps by attracting them toward each other; and each of the clamps has formed at either end thereof an engagement portion to catch each bottom corner of the concavity of each of the pair of frame members.

* * * * *